UNITED STATES PATENT OFFICE.

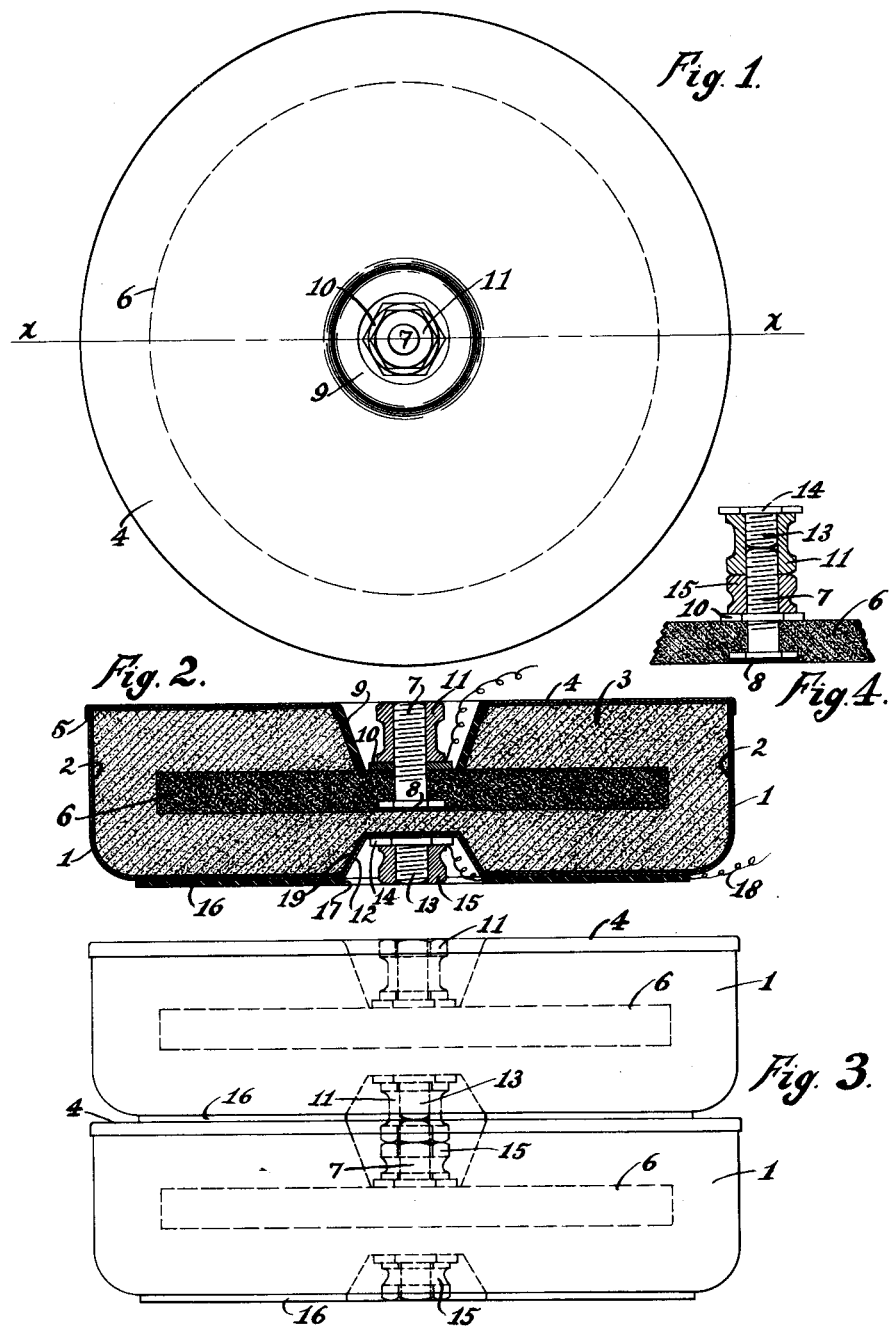
F. R. PARKER.
VOLTAIC CELL AND BATTERY.
APPLICATION FILED JAN. 29, 1910. RENEWED AUG. 28, 1915.
1,182,202.
Patented May 9, 1916.
3 SHEETS—SHEET 1.

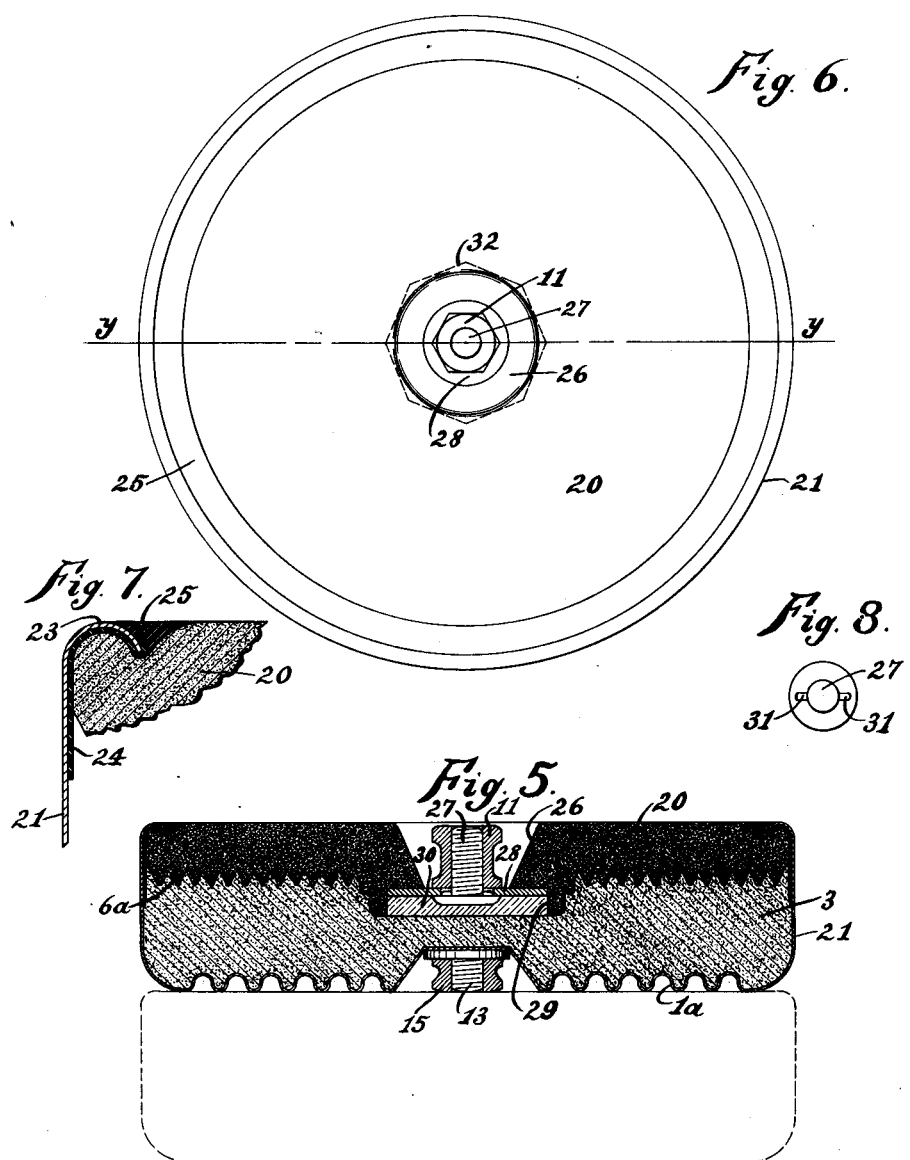

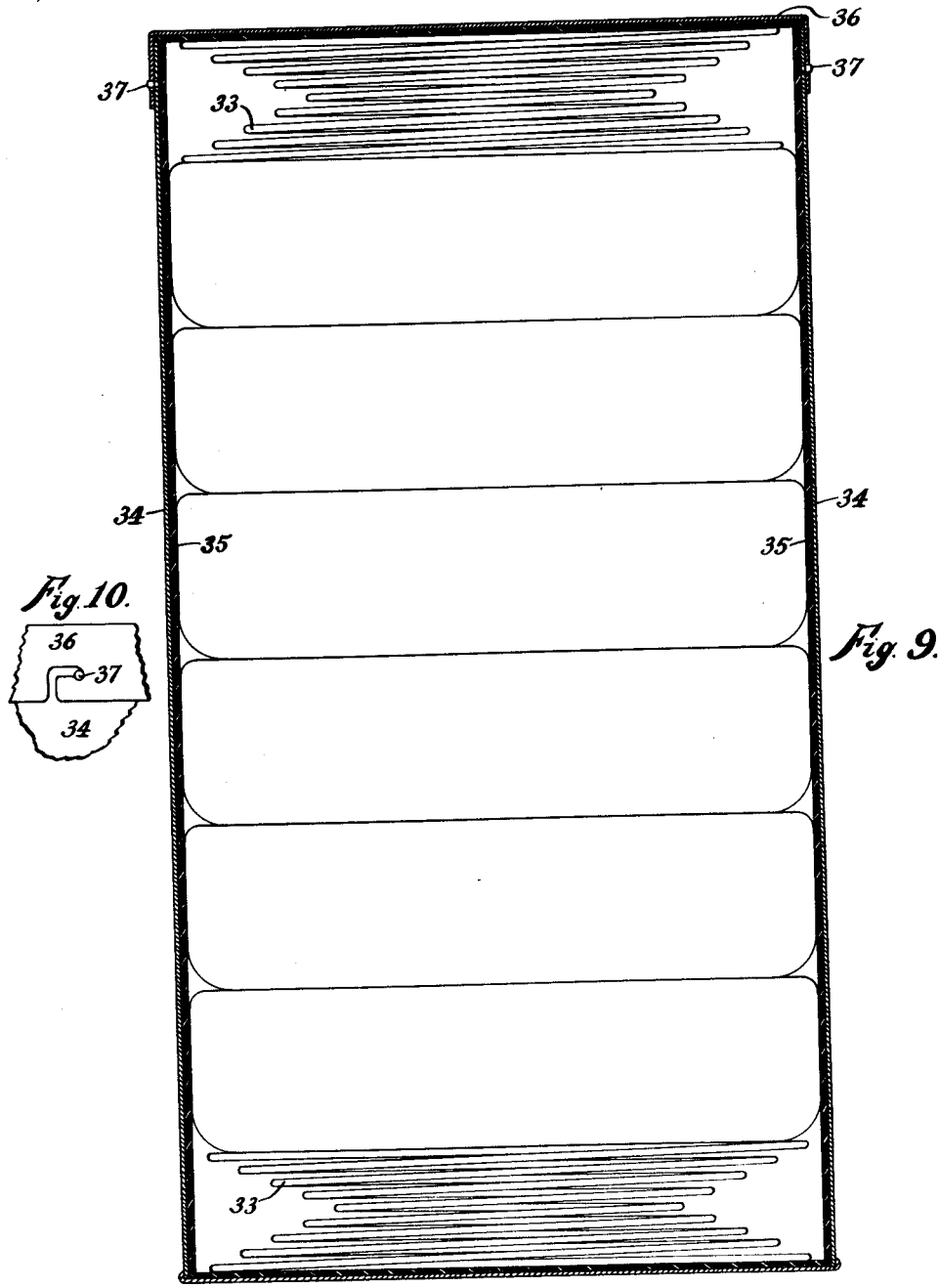

FREDERICK R. PARKER, OF CHICAGO, ILLINOIS.

VOLTAIC CELL AND BATTERY.

1,182,202.     Specification of Letters Patent.     Patented May 9, 1916.

Application filed January 29, 1910, Serial No. 540,870. Renewed August 28, 1915. Serial No. 47,893.

*To all whom it may concern:*

Be it known that I, FREDERICK R. PARKER, a citizen of the United States of America, residing at Chicago, in the county of Cook and State of Illinois, have invented a new and useful Voltaic Cell and Battery, of which the following is a specification, reference being had to the accompanying drawings, illustrating the preferred forms of my invention.

My invention relates to voltaic cells and batteries, the principal objects being, to provide an improved voltaic cell and battery as hereinafter more fully disclosed; to provide improved means for connecting two or more of the cells together to form a battery; to provide improved means for protecting the terminals of such cells and batteries from foreign objects and climatic attacks; to provide means for preventing the gradual or accidental loosening of the electrical connections with the cells or batteries, and between the cells of a battery, due to jarring or other causes; to provide an improved mounting for the battery to greatly reduce the jarring thereof; and to provide increased efficiency, durability, simplicity, and cheapness of manufacture in such cells and batteries.

Other objects will be apparent from the following specification.

The interior constructions of the cells disclosed herein, as well as other features thereof, form the subject matter of, and are claimed in, my co-pending patent application Serial No. 825,529, on voltaic cell and battery, which is a divisional application of the present application.

By reference to the accompanying drawings illustrating the preferred forms of my invention, Figure 1 is a top or plan view of one form of voltaic cell or battery of this invention; Fig. 2 is a cross-sectional view of the cell shown in Fig. 1, taken on plane *x x* thereof, with portions shown in elevation; Fig. 3 is a side view or elevation of two of the cells shown in Figs. 1 and 2, shown connected together both mechanically and electrically to form a battery; Fig. 4 is a cross-sectional view of the electrical and mechanical connection between the cells of Fig. 3, with portions shown in elevation; Fig. 5 is a cross-sectional view of another form of cell of the invention, taken the same as Fig. 2; Fig. 6 is a top or plan view of the cell shown in Fig. 5; Fig. 7 is an enlarged cross-sectional view of a portion of the insulated mechanical connection between the zinc cup and carbon plate of the cell shown in Figs. 5 and 6, showing the detail of such connection; Fig. 8 is an end view of the long binding post shown in Figs. 5 and 6; Fig. 9 is a side elevation of a battery of cells of the invention, mounted within an insulated sheet metal casing, between springs which reduce the jarring of the battery when used on vehicles, traction machinery, etc., the casing being shown in cross-section; and Fig. 10 is a side view or elevation of a portion of the casing shown in Fig. 9, taken near the top, showing the means for holding the lid of the casing in place.

Like characters refer to like parts in the several figures.

In this invention I preferably provide a rather broad, flat, disk-shaped cell, instead of the ordinary tall dry cells now in use, which enables me to make the metal casing thereof of formed sheet metal instead of the ordinary soldered-up tall can-like casing heretofore used. The advantages of my formed sheet metal casing over the ordinary soldered-up casing, are such as to greatly reduce the cost of manufacture of my cells. My flat cell also enables me to readily stack the cells one on another, to form a compact battery.

In connecting the cells or cell units of a stack together to form a battery, I provide means for connecting the adjacent terminals of the cells direct to each other, to rigidly hold all of the cells of the battery together and electrically connect them in series. This construction of building a rigid battery unit out of the cell units, is a great improvement over the ordinary batteries in which a number of cells are set side by side and connected together by short pieces of wire. The disadvantages of such wire connections are well known to those using the ordinary dry batteries.

In my improved battery the connections between the cells cannot jar loose as they often do in the ordinary dry batteries, because my cells are rigidly held together so as to hold on each other and thus prevent such loosening of the connections. I may employ various means for preventing the cells from becoming loosened from each other. I may also state here that any number of my cells may be connected in one stack; and that the stacks of my cells may be laid down and used in this position if desired. In fact my cells or batteries may be used in various positions. They may also be used upside-down if desired.

Dry cells made in accordance with my invention, that is, rather flat as shown, are much more efficient than the ordinary tall dry cells, because in filling the flat cells the moist excitant-depolarizer material is not unnecessarily packed at the bottom of the cell and made into an inactive hard mass, as in the ordinary tall cells, and also because the moisture in the flat cells cannot settle a considerable distance away from the tops of the cells and thus leave the top portions of the cells dry and inactive, as it does in the tall cells. In my cells practically the entire surface of the zinc is active, while in the tall dry cells the active surface of the zinc may not be more than one-half of the entire zinc surface. This enables me to make my cells for a given current capacity or output, much smaller than the ordinary tall dry cells having the same current capacity or output, and therefore of much less weight and much cheaper. In shipping my cells I therefore save a great deal in freight, on account of the reduced weight. Then again, my wide flat cells are much less liable to tip over than the ordinary tall cells, because they have a much wider base to sit on. On account of my cells being wide and shallow they can be much more readily and cheaply filled than the ordinary tall dry cells. Because of their shape I can fill them much more uniformly and can therefore make them much more uniform in output and efficiency than the ordinary tall dry cells. These are some of the features and advantages of my present invention.

I will now describe some of the forms of my invention more in detail, by reference to the drawings.

In the drawings, 1 is preferably a zinc cup or casing, formed from sheet zinc. The cup 1 can be readily drawn from a sheet of zinc because it is shallow compared with its diameter. If desired, the cup 1 may be corrugated or ribbed as shown at 1ᵃ in Fig. 5, to increase the surface thereof. The cup 1 may be lined with a sheet of soft paper 2, or other suitable material, to prevent the excitant material 3 from causing local action on the zinc or short-circuiting the cell. The zinc 1 may also be amalgamated if desired, to prevent local action.

4 is preferably a zinc lid for the cup 1, which lid may be lined with paper or other suitable material, and also amalgamated, if desired, the same as the cup 1. The lid 4 is preferably soldered to the cup 1 around the edge thereof at 5, after the carbon electrode 6 and the excitant-depolarizer material 3 are put in place in the cup 1, to make a tight joint between the parts 1 and 4. The lid 1 may also be corrugated or ribbed if desired, to increase the surface thereof. Of course I do not wish to limit this invention to the particular constructions and shapes of cells shown.

The carbon electrode 6 is preferably a circular disk having a central hole therethrough to accommodate the binding post 7 which is preferably connected therewith as shown; the head of the post or bolt 7 being preferably hexagonal to keep it from turning in the carbon plate 6, and also being covered by a suitable sealing material 8, such as sealing wax, or other material, to protect it from the action of the excitant material 3. The carbon plate or disk 6 may be corrugated on one or both sides if desired, to increase the surface thereof, as shown at 6ᵃ in Fig. 5.

The excitant-depolarizer material 3, which may be a mixture of water, salammoniac, manganese-dioxid and carbon dust, or some other chemical mixture adapted to give the required results in a cell of this sort, is placed within the casing 1—4, filling same and surrounding the electrode 6, this filling material 3 being firmly pressed in place so as to completely fill the cup 1. In filling the cell of Fig. 2 a portion of the material 3 is first pressed in place in the suitably lined cup 1, then the carbon disk 6 with its binding post 7 is put in place on this first charge of the material 3, and then the remainder or second charge of the material 3 is pressed in place over the carbon disk 6. Then the lid 4 with its lining is put in place and soldered to the cup 1 at 5, and then the cell is sealed at 9 around the binding post 7 from the lid 4 to the carbon disk 6, by a suitable insulating sealing material 9, such as pitch or some other suitable material, preferably as shown. The cell being sealed in this manner provides a recess within the body portion of the cell for accommodating the binding post 7. On the long binding post 7 is preferably screwed a thin nut 10 and a long thumb nut 11. In attaching a wire to the post 7 it is preferably looped around the post 7 between the nuts 10 and 11.

The zinc cup 1 is recessed at 12 to accommodate the short binding post 13, the head 14 of the post 13 being preferably soldered to the flat portion of the recessed portion 12 as shown. I prefer to insulate the recessed portion 12 of the zinc from the excitant material 3, by means of an insulating cap 19 of asbestos paper, mica, or other suitable material, placed over the portion 12, or by coating the portion 12 with an insulating enamel on its inner surface, to prevent too quick consumption of the zinc at this point where the internal resistance of the cell is somewhat reduced by the formation of the portion 12. The post 13 is provided with a short thumb nut 15. In attaching a wire to the post 13 it is preferably looped around the post 13 between the head 14 and the nut 15. With this form of binding post set within the body portion of the cell, the latter may sit flat on its base without rocking on the said post.

On the bottom of the cell is preferably cemented a cushion 16 of rubber, asbestos, cardboard, or other suitable material, to provide a cushion for the cell and a cushion and insulating member between the cells when two or more are attached together as shown in Fig. 3. The cushion 16 is preferably grooved or slitted from the central opening 17 therein to the outer edge, to accommodate the wire 18 leading to the post 13.

When it is desired to attach two of the cells together, it is only necessary to reverse the adjacent short and long nuts 15 and 11 of the adjacent short and long posts 13 and 7, respectively, on these posts, and then screw the said adjacent posts into the long nut 11 as shown in Figs. 3 and 4. This connection electrically connects the cells together in series and also mechanically connects them direct with each other to form a rigid unit of the whole. The casings of the cells are kept insulated from each other by the interposed cushion member 16, and the cells holding on each other over a large surface prevent the connections between the cells from jarring or working loose. Of course it is immaterial which one of the binding posts of a cell is the long one and which is the short one. With this means of connecting the cells together there are no extra parts required for and none discarded in making the connections, each cell being a complete unit in itself and capable of usage as such or as an element of a battery. Whether one or more of the cells are used as a battery or source of electricity, such battery is always complete in itself without employing any extra parts or discarding any parts of the cell units used to make up the battery. Likewise if a battery of a number of cells is divided into two or more batteries, each divisional battery so formed will be complete in itself without employing any extra parts or discarding any of the parts. Such a complete cell, with complete terminals, is shown in Fig. 2 of the drawings, and such a complete battery, with complete terminals, is shown in Fig. 3. The advantages of this feature of the invention are very apparent. It will be seen that the intermediate terminals of my battery are incased or inclosed by the cells, and therefore protected from foreign objects and injurious substances. It will also be seen that the binding posts or terminals do not project out past the body portion of the cell, and are therefore not liable to be broken off or damaged. This feature is of great advantage in packing, shipping and handling the cells. I wish it to be understood that the connecting device shown in Fig. 4 may also be used for other purposes besides connecting means for cells of a battery, and that I desire to claim it for various purposes.

In the form of cell shown in Figs. 5 and 6, the carbon disk 20 forms the top of the cell, the zinc cup 21 forming the sides and bottom of the cell. In this case the excitant-depolarizer material 3 is all put into the cell in one charge and pressed in place by a suitable ram or plunger. In this form of cell I preferably roll the upper edge of the zinc cup 21 over into an annular groove in the carbon disk 20, as at 23 in Fig. 7, to firmly hold the parts together, the zinc 21 being insulated from the carbon 20 by a strip of insulating material 24, such as mica, asbestos paper, or other suitable material, the upper edge of which insulation is formed around the edge of the zinc as shown in Fig. 7. I also fill the annular groove in the carbon with an insulating sealing material 25, such as pitch or some other suitable material, to tightly seal the joint between the zinc and carbon and give it a finished appearance. The zinc and carbon electrodes are preferably corrugated as shown at 1ª and 6ª respectively, to increase the surfaces of these parts. In this cell the binding post 27 is preferably located within a conically-shaped recess 26 in the carbon disk 20, the post 27 extending through a metallic washer 28 which is held in a recess 29 in the underneath side of the carbon disk 20 by a sealing material 30 preferably as shown. The post 27 is preferably provided with lugs 31 31 thereon fitting into recesses in the washer 28, and the washer 28 and recess 29 are preferably made polygonal in shape, as shown at 32 in Fig. 6, to keep the post 27 from turning relatively to the carbon disk 20. When two or more of these cells are connected together to form a battery, the zinc cup 21 of one cell preferably rests against the carbon disk 20 of the next cell, as shown in Fig. 5, there not being required any insulation between the cells in this case. These cells are connected together by simply reversing the adjacent binding nuts on the adjacent binding posts, the same as for the cells shown in Figs. 1, 2 and 3 and then screwing the cells together. Thus I am able to provide a very cheap and efficient cell and battery, in the form shown in Figs. 5, 6 and 7.

In Fig. 9 I have shown my battery mounted between two coil springs 33 33 in a sheet metal case 34, the latter being preferably lined with an insulating material 35, such as cardboard, asbestos paper, or other suitable material, and having a lid or cover 36 held in place by a pair of projecting pins 37 37 in a manner illustrated in Fig. 10 and well understood. In putting the cover 36 in place on the battery receptacle 34, the springs 33 33 are somewhat compressed so as to hold the battery firmly but yieldingly between them. The springs 33 33 also tend to raise the cover 36 and thereby cause the pins 37 37 to securely hold it in place in a manner well understood. With this mounting for the battery, all sudden jarring is kept therefrom; in such places as on automobiles and traction machinery. This eliminating the jarring from the battery makes it more serviceable and efficient, and greatly lessens the chances of damaging it. In some instances I can do away with the top spring 33, and in some instances I can also employ other cushion means, such as a pneumatic cushion, spongy rubber, etc., at the base of the battery, or at the top thereof, or at both places. In thus eliminating the jarring of the battery, the connections between the cells, and the connections with the circuit wires, cannot jar loose.

I do not wish to limit this invention to the particular details of construction, nor to exact materials, herein set forth, as various modifications thereof may be made or utilized without departing from the scope of the appended claims.

What I claim herein is:

1. An electric battery comprising individual cells each having long and short screw terminal posts with corresponding nuts, whereby a reversal of the nuts on the posts serves to condition the cells to be connected together.

2. A connector for batteries composed of individual cells, comprising screw posts of different lengths carried by the cells and placed end to end, and nuts for the posts of corresponding lengths whereby through a reversal of the nuts on the posts the latter may be connected together.

3. An electric battery comprising individual cells having screw terminal posts, the electrically-opposite posts of adjacent cells being placed end to end and electrically connected by means of a screw connection.

4. In an electric battery composed of individual cells, connectors for the cells located in recesses in the body portions of the cells whereby when the cells are connected together the intermediate connectors are substantially incased by the cells.

5. An electric battery comprising individual cells stacked one on another, and screw terminals on the tops and bottoms of the cells through the agency of which the cells are electrically and mechanically connected.

6. A connector for batteries composed of individual cells, consisting of a pair of screw posts carried by the cells and screwed end to end into a nut.

7. An electric battery comprising individual cells having screw terminals, the electrically-opposite terminals of adjacent cells being electrically connected end to end by means of a screw connection.

8. An electric battery comprising individual cells stacked one on another, and screw terminals on the tops and bottoms of the cells connecting the cells electrically together.

9. An electric battery comprising individual cells having screw connectors whereby one cell may be screwed bodily to another, the said connectors serving also as electrical connections between the cells.

10. In an electric battery composed of individual cells, screw connectors on opposite sides of the cells through the agency of which the cells are screwed together, the said connectors being located within recesses in the body portions of the cells whereby when the cells are connected together the intermediate connectors are incased by the cells.

11. A connector for batteries composed of individual cells, consisting of a pair of posts carried by the cells and connected end-on by means of a screw connection.

12. An electric battery comprising individual cells having long and short screw terminal posts with long and short nuts the reversal of which on the posts serves to condition the cells to be connected together.

13. A connector for batteries composed of individual cells, comprising screw posts of different lengths carried by the cells, and nuts for the posts of different lengths through a reversal of which on the posts the latter may be connected together.

14. An electric battery comprising individual cells placed one on another, and screw terminals on opposite sides of the cells through the agency of which the cells are electrically and mechanically connected.

15. A connector for batteries composed of individual cells, consisting of a long and a short screw post carried by the cells and screwed end-on into a nut.

16. A connector for batteries composed of individual cells, consisting of a long and a short screw post carried by the cells and connected end-on by means of a screw connection.

17. An electric battery comprising individual cells having screw terminals, the electrically-opposite terminals of adjacent cells being electrically connected by means of a screw connection operated by turning one cell relatively to another.

18. An electric battery comprising individual cells placed one on another, and screw terminals on opposite sides of the cells connecting the cells electrically together.

19. In a battery composed of individual cells, screw terminals carried by the cells and through the agency of which the cells are screwed bodily together by turning one cell relatively to another, the said terminals forming electrical connections for connecting the cells in series.

20. In a battery composed of individual cells, a screw terminal carried by one cell and through the agency of which its cell is screwed bodily to another cell by turning one cell relatively to the other, the said terminal forming an electrical connection for connecting the cells in series.

21. In a battery composed of individual cells, a screw post carried by one of the cells and screwed to another cell by turning said post relatively to said other cell whereby the cells are connected in series.

22. An electric battery composed of individual cells each having greater breadth than height when in a certain position, and terminal posts on the tops and bottoms of the cells, considering the cells to be in the position mentioned, by means of which the cells are electrically and mechanically connected together.

23. An electric battery composed of individual cells each having greater breadth than height when in a certain position, and terminal posts on the tops and bottoms of the cells, considering the cells to be in the position mentioned, by means of which the cells are electrically connected together.

24. A voltaic cell having a long terminal post on one side thereof and a short terminal post on the opposite side thereof, the said posts having accessible portions thereof located within recesses in the body portion of the cell.

25. A voltaic cell having terminals therefor on opposite sides thereof, the said terminals having accessible portions thereof located within recesses in the cell.

26. A voltaic cell having terminals therefor, the said terminals having accessible portions thereof located within recesses in the cell.

27. A voltaic cell having positive and negative terminal posts therefor, the said posts having accessible portions thereof located within recesses in the body portion of the cell.

28. A voltaic cell having positive and negative terminal posts therefor, the said posts having accessible portions thereof located within recesses in the body portion of the cell whereby when two of the cells are connected together the terminals so connected are inclosed by the cells for protection, and means for connecting the cells together in this manner.

29. A voltaic cell having a terminal post therefor, the said post having an accessible portion thereof located within a recess in the body portion of the cell whereby when two of the cells are connected together the terminals so connected are inclosed by the cells for protection, and means for connecting the cells together in this manner.

30. A voltaic cell constructed in the form of a disk and having a long terminal post on one side thereof and a short terminal post on the opposite side thereof set within recesses in the cell, the said posts having respective long and short nuts therefor whereby a reversal of the nuts on the posts conditions the cell to be connected with other cells.

31. A voltaic cell constructed in the form of a disk and having a long terminal post on one side thereof and a short terminal post on the opposite side thereof, the said posts having respective long and short nuts therefor whereby a reversal of the nuts on the posts conditions the cell to be connected with other cells.

32. A voltaic cell having long and short terminal posts on opposite sides thereof, the said posts having respective long and short nuts therefor whereby a reversal of the nuts on the posts conditions the cell to be connected with other cells.

33. A voltaic cell having long and short terminal posts on different sides thereof, and respective long and short nuts for the posts whereby a reversal of the nuts on the posts conditions the cell to be connected with other cells.

34. A voltaic cell having long and short terminal posts therefor on different sides thereof and set within recesses in the cell, and respective long and short nuts for the posts whereby a reversal of the nuts on the posts conditions the cell to be connected with other cells.

35. In a voltaic cell having greater breadth than height when in a certain position, terminal posts therefor centrally located on the top and bottom of the cell, considering the cell to be in the position mentioned.

36. In a voltaic cell having greater breadth than height when in a certain position, terminal posts therefor on the top and bottom of the cell, considering the cell to be in the position mentioned.

37. In a voltaic cell having greater breadth than height when in a certain position, terminal posts therefor with accessible portions contained within centrally located recesses on the top and bottom of the cell, considering the cell to be in the position mentioned.

As inventor of the foregoing, I hereunto subscribe my name at Chicago, county of Cook and State of Illinois, in the presence of two subscribing witnesses, this 27th day of January, 1910.

FREDERICK R. PARKER.

Witnesses:
A. C. THOMPSON,
MICHAEL J. STARK.